United States Patent [19]

Brusasco

[11] Patent Number: 4,597,305
[45] Date of Patent: Jul. 1, 1986

[54] SCREW-NUT SCREW COUPLING WITH BALL CIRCULATION AND A METHOD FOR ITS ASSEMBLY

[75] Inventor: Enzo Brusasco, Turin, Italy
[73] Assignee: Roltra S.p.A., Turin, Italy
[21] Appl. No.: 618,883
[22] Filed: Jun. 8, 1984
[30] Foreign Application Priority Data
   Aug. 2, 1983 [IT] Italy ................. 67836 A/83
[51] Int. Cl.⁴ ............ F16H 1/18; F16H 1/20; F16H 27/02; F16H 29/02
[52] U.S. Cl. ............... 74/424.8 A; 74/424.8 R; 74/89.15
[58] Field of Search .......... 74/424.8 A, 424.8 R, 74/424.8 NA, 89.15

[56] References Cited

U.S. PATENT DOCUMENTS

| | | | |
|---|---|---|---|
| 2,945,392 | 7/1960 | Folkerts | 74/459 |
| 3,132,719 | 5/1964 | Cole | 74/424.8 R |
| 3,667,311 | 6/1972 | Wysong | 74/424.8 R |
| 3,961,541 | 6/1976 | Fund et al. | 74/459 |
| 4,198,872 | 4/1980 | Metz | 74/424.8 R |
| 4,226,137 | 10/1980 | Sharp | 74/459 |
| 4,272,476 | 6/1981 | Benton | 74/459 |
| 4,342,235 | 8/1982 | Benton | 74/459 |

FOREIGN PATENT DOCUMENTS

| | | | |
|---|---|---|---|
| 2018777 | 11/1970 | Fed. Rep. of Germany | 74/89.15 |
| 2355844 | 11/1972 | Fed. Rep. of Germany | 74/459 |

Primary Examiner—Kenneth J. Dorner
Assistant Examiner—Michael D. Bednarek
Attorney, Agent, or Firm—Omri M. Behr

[57] ABSTRACT

A screw-nut screw coupling with ball circulation, in which the nut screw comprises at least one radial through bore, the surface of which embraces at least two adjacent turns of a circulation track for the balls. Each of said bores is engaged by a substantially cylindrical block which comprises at one end a diametrical groove for putting said two turns into communication, and is traversed by an axial bore which is closed externally by a removable element and is arranged to allow loading of the balls. These latter are loaded by supporting the screw and nut screw in a mutually coaxial position, and feeding the balls through the bore thereof while the screw is rotated relative to the nut screw.

6 Claims, 10 Drawing Figures

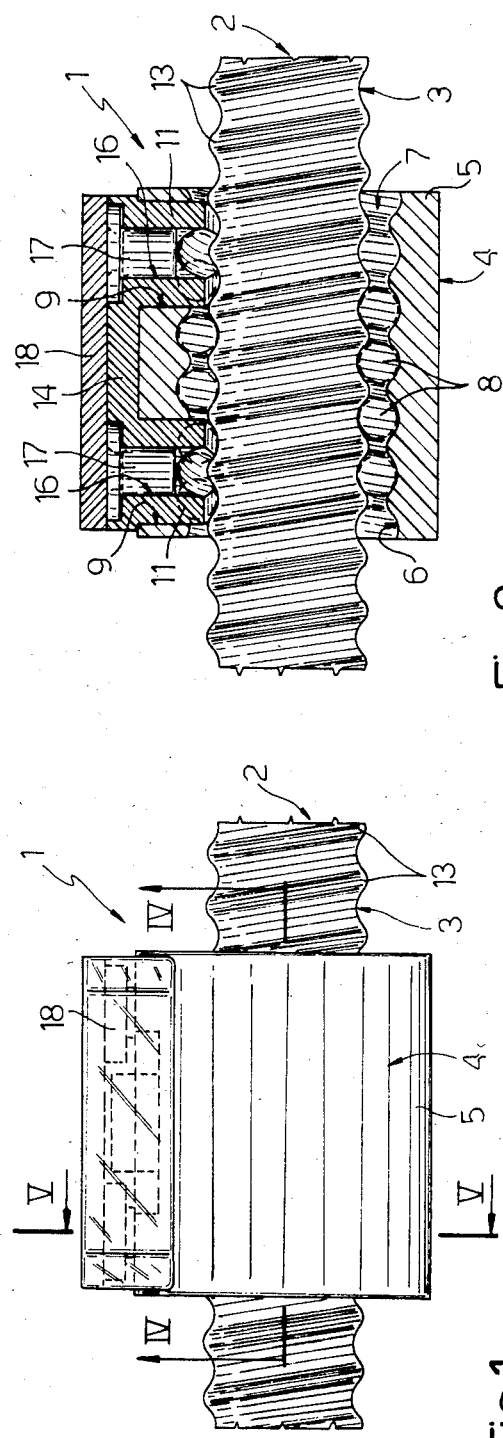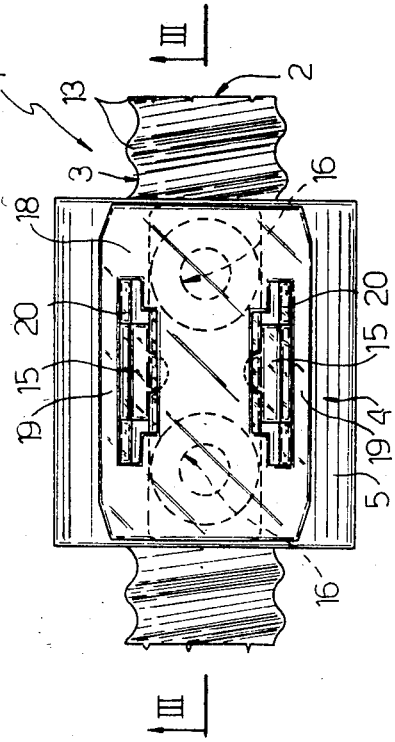

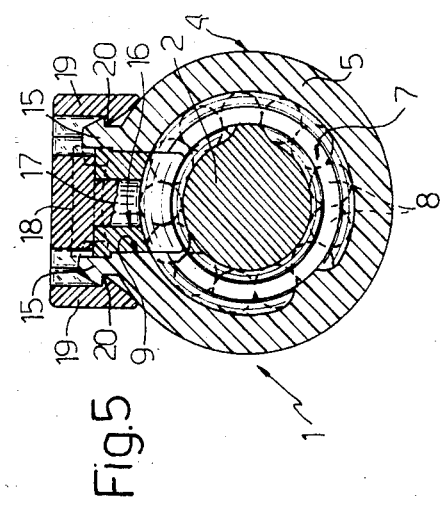
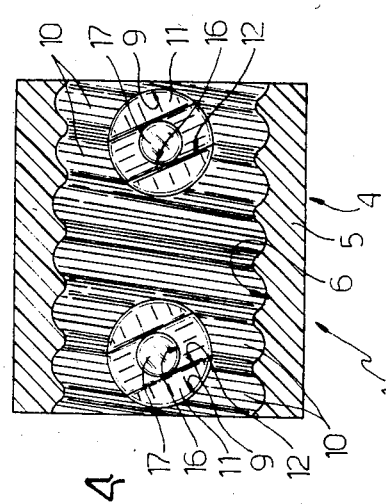
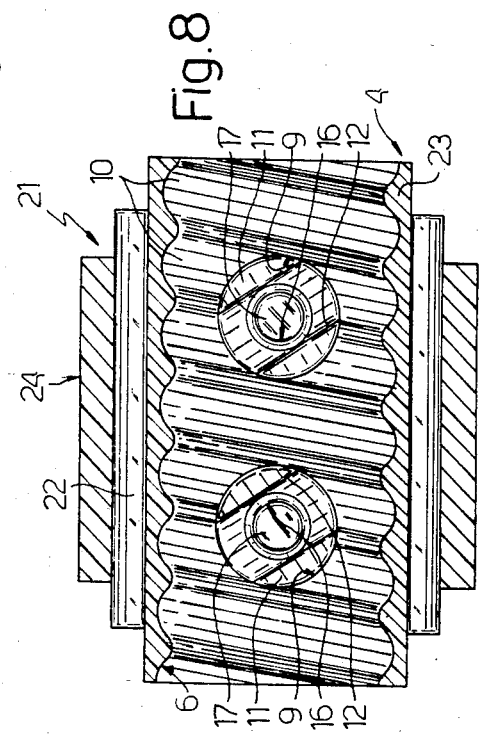
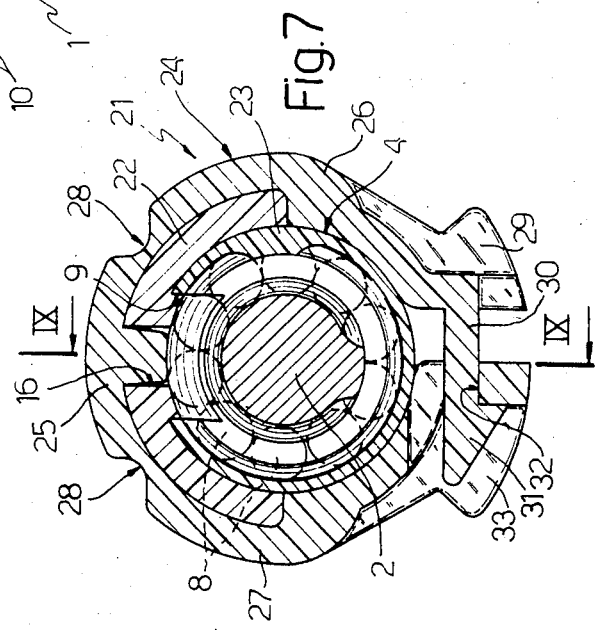

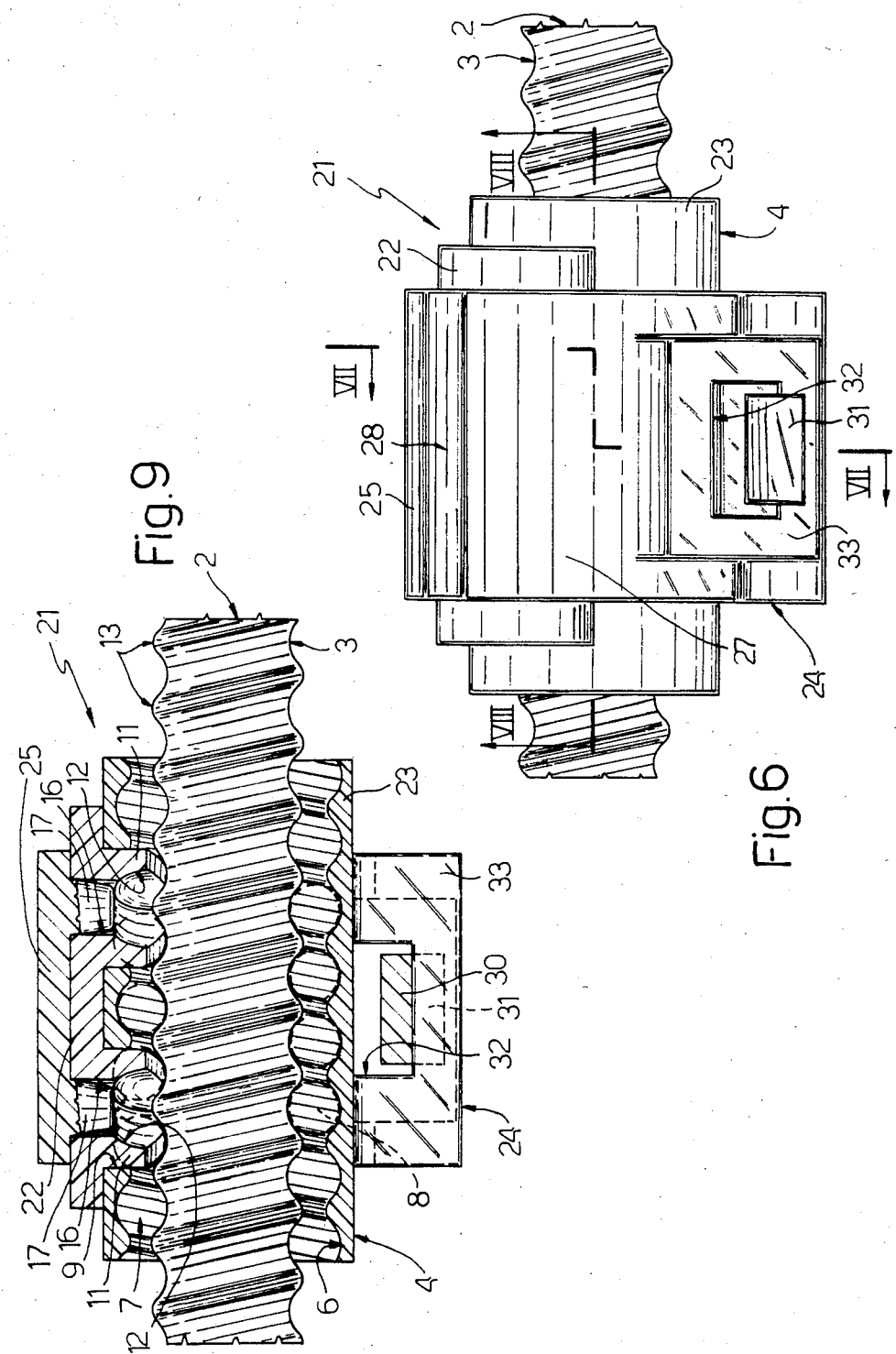

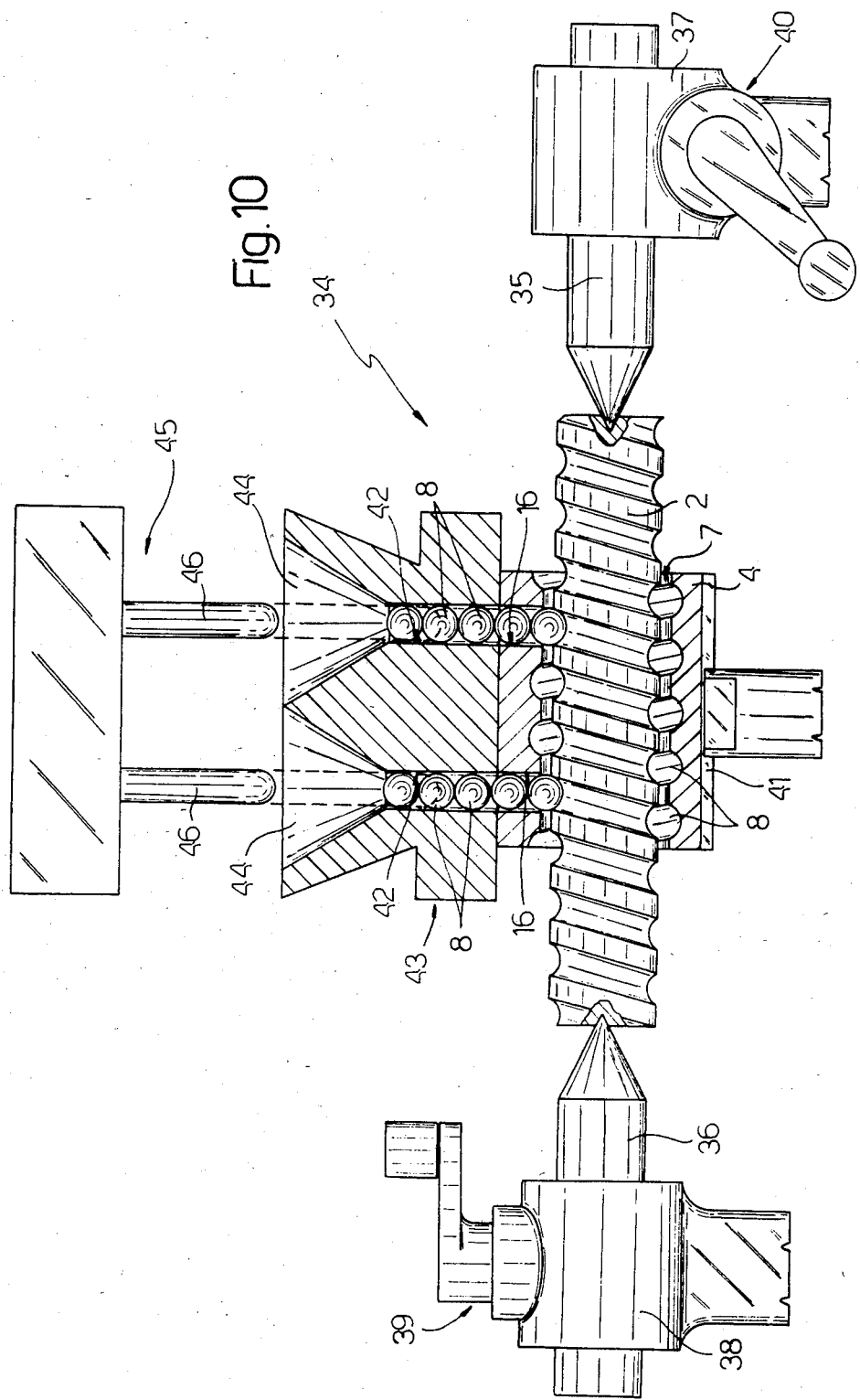

SCREW-NUT SCREW COUPLING WITH BALL CIRCULATION AND A METHOD FOR ITS ASSEMBLY

BACKGROUND OF THE INVENTION

This invention relates to a screw-nut screw coupling with ball circulation.

In particular, the invention relates to a screw-nut screw coupling with ball circulation, in which the nut screw is provided with at least one internal recirculation channel extending between two adjacent turns.

Nut screws of the aforesaid type are normally employed in all those applications in which the advantages deriving from the use of a screw-nut screw coupling with ball circulation must be associated with relatively low constructional costs.

In known nut screws of the aforesaid type, each recirculation channel is defined by a groove provided on the end of a block mounted in a respective radial through bore provided in said nut screw and embracing two adjacent internal turns thereof. The block is positioned in such a manner that the relative groove connects together the two aforesaid turns and enables the balls to pass from one to the other.

The use of relatively economical materials and progress in the methods for manufacturing screws and nut screws have enabled the production costs of the aforesaid couplings to be considerably reduced. However, these costs remain relatively high because the operations involved in introducing the balls between the screw and nut screw continue to be carried out manually and are more laborious the smaller the diameter of the balls used.

SUMMARY OF THE INVENTION

The object of the present invention is to provide a screw-nut screw coupling with ball circulation, the design of which is such as to enable the operations involved in introducing the balls between the screw and nut screw to be automated.

The said object is attained according to the present invention by a screw-nut screw coupling with ball circulation, comprising a screw and a nut screw which define between them a helical rolling track for a plurality of balls interposed between said screw and nut screw, and at least one recirculation channel for said balls; each of said recirculation channels comprising a groove provided in the inner surface of said nut screw and connecting together two adjacent turns of said helical track, characterised by further comprising, for each of said recirculation channels, a through radial loading bore provided in said nut screw and communicating at one end with the outside and at the other end with an intermediate point of the relative said groove; said loading bore having a diameter at least equal to that of said balls, and removable closure means being provided for closing the outer end of said loading bore.

The present invention also relates to a method for assembling the aforesaid coupling.

The present invention provides a method for assembling a screw-nut screw coupling with ball circulation as heretofore defined, characterised by comprising the following stages:

supporting said screw and said nut screw in mutually coaxial positions with said screw mounted through said nut screw;

rotating said screw relative to said nut screw, and feeding said balls into said track through each of said radial loading bores.

BRIEF DESCRIPTION OF THE DRAWINGS

Further characteristics and advantages of the present invention will be apparent from the description give hereinafter of some non-limiting embodiments with reference to the accompanying drawings in which:

FIG. 1 is a side elevational view of one embodiment of a screw-nut screw coupling with ball circulation in accordance with the present invention;

FIG. 2 is a plan view of the coupling of FIG. 1;

FIG. 3 is a section on the line III—III of FIG. 2;

FIG. 4 is a section on the line IV—IV of FIG. 1;

FIG. 5 is a section on the line V—V of FIG. 1;

FIG. 6 is a side elevational view of a second embodiment of a screw-nut screw coupling with ball circulation in accordance with the present invention;

FIG. 7 is a section on the line VII—VII of FIG. 6;

FIG. 8 is a section on the line VIII—VIII of FIG. 6;

FIG. 9 is a section on the line IX—IX of FIG. 7; and

FIG. 10 is a diagrammatic illustration of an apparatus for assembling the coupling of the present invention, using the method according to the present invention.

DETAILED DESCRIPTION OF THE INVENTION

FIGS. 1 to 5 show a screw-nut screw coupling with ball circulation, indicated overall by 1 and comprising a screw 2 containing externally a helical groove 3, and a nut screw 4 constituted by a cylindrical bush 5 preferably of plastics construction and provided in its inner surface with a helical groove 6. This latter cooperates with the groove 3 to define a rolling track 7 for a plurality of balls 8 interposed between the screw 2 and nut screw 4.

As shown specifically in FIGS. 3 and 4, there are provided in the bush 5 two radial through bores 9, the inner end of each of which embraces a respective pair of adjacent turns 10 (FIG. 4) of the helical groove 6.

In each of the bores 9 there is mounted a cylindrical block 11, on the inner end of which there is provided a diametrical groove 12 which is positioned in such a manner as to put the turns 10 into mutual communication, and has a depth greater than that of the groove 6 and such as to enable the turns 8 to straddle the helical ridge 13 which separates the adjacent turns of the groove 3.

The two blocks 11 are connected together by a plate 14 which extends in contact with the outer surface of the bush 5 between two toothed appendices 15 (FIG. 5) extending outwards from the bush 5 in a substantially radial direction.

Each of the blocks 11 comprises an axial loading bore 16, the diameter of which is at least equal to that of the balls 8, and of which the outer end is closed by a respective cylindrical plug 17 carried by a removable cover 18 mounted on the plate 14. For this purpose, the cover 18 is of substantially U cross-section and comprises two lateral edges 19, each of which is provided with an inner terminal tooth 20 arranged to snap-cooperate with a respective toothed appendix 15 in order to lock the cover 18 in a closure position straddling the plate 14 and the blocks 11, and with its plugs 17 inserted into the respective bores 16. The modification shown in FIGS. 6 to 9 relates to a screw-nut screw coupling with ball circulation, which is indicated overall by 21 and differs from the coupling 1 both by the manner in which the blocks 11 are connected together and by the system for closing the bores 16.

Specifically, as shown in FIG. 7, the blocks 18 extend radially inwards from a curved plate 22 cooperating with the outer surface of the nut screw 4 which, in this case, is constituted by a cylindrical bush 23 preferably of metal construction.

The plate 22 is kept in position by an openable collar 24 of plastics construction which comprises an intermediate portion 25 and two terminal portions 26 and 27 connected together by hinges 28. These latter are defined by respective axial grooves provided in the outer surface of the collar 24.

At its free end, the terminal portion 26 comprises an axial rib 29, from which there laterally projects an appendix 30, a toothed portion 31 of which snap-engages in an aperture 32 provided through an axial rib 33 of the terminal portion 27.

The intermediate portion 25 carries rigidly connected to its inner surface the two plugs 17, which are each constituted by a radial appendix integral with the collar 24 and engaging the respective bores 16.

The presence of the bores 16, which according to a non-illustrated modification can be provided directly through the bush 5 or 23, and in which case the inner surface thereof must directly carry the grooves 12, enables the balls 8 to be automatically loaded into the track 7 by using a relatively simple apparatus illustrated diagrammatically in FIG. 10 and indicated overall by the reference numeral 34. The apparatus 34 comprises a headstock 35 and tailstock 36 which are rotatably mounted on relative supports 37 and 38. The tailstock 36 is provided with an operating device 39 arranged to move it axially in order to clamp the screw 2 against the headstock 35, and the headstock 35 is provided with an operating device 40 arranged to rotate it about its axis together with the screw 2 and tailstock 36.

The apparatus 34 also comprises an adjustable support or saddle 41 arranged to support the nut screw 4 in a fixed position in the space between the headstock 35 and tailstock 36, in a position coaxial to the screw 2 in such a manner as to define the track 7. During the assembly operation, the nut screw 4 is disposed on the support 41 with its bores 16 facing upwards and aligned with the lower ends of two loading ducts 42 provided through a loading member 43 comprising two hoppers 44, each of which communicates with the upper end of a respective duct 42. The pusher member 45, which is provided with two plungers 46 arranged to each slidably engage in a respective duct 42, is disposed above the hoppers 44. When in operation, having mounted the nut screw 4 on the saddle 41 and the screw 2 between the headstock 35 and tailstock 36 and through the nut screw 4 in a position coaxial therewith, the device 40 is driven so as to rotate the screw 2 relative to the nut screw 4. At the same time, the loading member is moved in such a manner as to bring the lower ends of the ducts 42 into contact with the outer ends of the bores 16, and the pusher member 45, which can also be dispensed with, is operated in order to cause the balls 8, which are contained in a predetermined number in the hoppers 44, to enter the ducts 42 and the bores 16, and then the tracks 7, aided in this by the rotation of the screw 2.

I claim:

1. A screw-nut screw coupling with circulating balls, comprising:

a screw;

a nut screw, said screw and said nut screw defining therebetween a helical track;

a plurality of balls interposed between said screw and said nut screw and arranged within said track for rolling therealong, said nut screw having at least one channel communicating with said track for recirculation of said balls, said channel comprising a recirculation groove provided within said nut screw and connecting together two adjacent turns of said helical track, said nut screw having a ball loading through bore provided in said nut screw and extending outwards from an intermediate point of said recirculation groove, said ball-loading bore having a diameter sized to allow said balls to move therethrough one by one in a sequence; and removable closure means supported by said nut screw for closing said ball-loading bore.

2. A coupling as claimed in claim 1, wherein said nut screw has therein a radial through hole embracing two adjacent turns of said helical track, said coupling further comprising:

a cylindrical block fitted in said hole and having an inner end facing the periphery of said screw, said recirculation groove being provided diametrically on the inner end of said block, and said ball-loading bore being provided axially through said block.

3. A coupling as claimed in claim 2, further comprising:

a plate arranged externally of said nut screw and in contact therewith, said block extending from said plate and being rigidly connected therewith disposed in contact with the outer surface of said nut screw.

4. A coupling as claimed in claim 3, wherein said removable closure means comprise:

a cover snap-cooperating with said plate.

5. A coupling as claimed in claim 3, wherein said plate is curved, said removable closure means comprising:

a collar mounted about said plate and said nut screw.

6. A coupling as claimed in claim 1, wherein said removable closure means comprise a plug removably engaging said ball-loading bore.

* * * * *